United States Patent [19]

Wiedeburg

[11] Patent Number: 4,545,078
[45] Date of Patent: Oct. 1, 1985

[54] METHOD AND ARRANGEMENT FOR CONTROLLING A LIGHT SWITCH FOR OPTICAL SIGNALS

[75] Inventor: Klaus Wiedeburg, Puchheim, Fed. Rep. of Germany

[73] Assignee: Siemens Aktiengesellschaft, Berlin & Munich, Fed. Rep. of Germany

[21] Appl. No.: 437,208

[22] Filed: Oct. 28, 1982

[30] Foreign Application Priority Data

Nov. 27, 1981 [DE] Fed. Rep. of Germany ....... 3147109
Dec. 23, 1981 [DE] Fed. Rep. of Germany ....... 3151209
Jun. 11, 1982 [DE] Fed. Rep. of Germany ....... 3221945

[51] Int. Cl.$^4$ .............................................. H04B 9/00
[52] U.S. Cl. .................................. 455/600; 350/96.13; 350/96.14
[58] Field of Search .............................. 455/600, 612; 350/96.13, 96.14

[56] References Cited

U.S. PATENT DOCUMENTS

| | | | |
|---|---|---|---|
| 3,593,295 | 7/1971 | Joel, Jr. | 340/166 R |
| 3,638,193 | 1/1972 | Opferman | 340/172.5 |
| 4,012,113 | 3/1977 | Kogelnik et al. | 350/96.13 |
| 4,153,329 | 5/1979 | Gilette | 350/96.13 |
| 4,211,467 | 7/1980 | Cross et al. | 350/96.14 |
| 4,394,060 | 7/1983 | Verber et al. | 350/96.13 |
| 4,415,226 | 11/1983 | Verber et al. | 350/96.14 |

FOREIGN PATENT DOCUMENTS 1922891 11/1969 Fed. Rep. of Germany.
2036128 11/1971 Fed. Rep. of Germany.
2036176 2/1972 Fed. Rep. of Germany.

OTHER PUBLICATIONS

Sasaki et al., "Electro-Optic Y-Junction Modulator/Switch", Electronics Letters, Sep. 2, 1976, vol. 12, No. 18, pp. 459–460.

Taylor, H. F., "Optical-Waveguide Connecting Networks", Electronics Letters, Feb. 21, 1974, vol. 10, No. 4, pp. 41–43.

Schmidt et al., "Experimental 4×4 Optical Switching Network", Electronics Letters, Oct. 28, 1976, vol. 12, No. 22, pp. 575–577.

Schmidt et al., "Metal-Diffused Optical Waveguides in LiNbO$_3$", Applied Physics Letters, vol. 25, No. 8, Oct. 15, 1974, pp. 458–460.

Tada et al., "A New Light Modulator . . . Two Coupled Guides", Applied Physics Letters, vol. 25, No. 10, Nov. 15, 1974, pp. 561–562.

Campbell et al., "GaAs Electro-Optic Directional-Coupler Switch", Applied Physics Letters, vol. 27, No. 4, Aug. 15, 1975, pp. 202–205.

Papuchon et al., "Electrically Switched Optical Directional Coupler: Cobra", Applied Physics Letters, vol. 27, No. 5, Sep. 1, 1975, pp. 289–291.

(List continued on next page.)

Primary Examiner—Joseph A. Orsino, Jr.
Attorney, Agent, or Firm—Hill, Van Santen, Steadman & Simpson

[57] ABSTRACT

A control arrangement and method are provided for controlling a light switch, manufactured in integrated technology, for optical signals which are transmitted in a light guide. The light switches are applied on a first substrate of GaAs or of LiNbO$_3$, whereby there is connected, to the light guide for the purpose of controlling the light switch at least one electrically-controllable, electrically conductive electrode of the light switch and whereby, controlled by the electric control potential on the electrode, the light guided in the respective guide is switched. On a second substrate, a digital/analog converter is provided which is stabilized with regard to its analog output voltage against DC voltage supply fluctuations. The digital/analog converter is applied in integrated technology, whereby the analog output side of the converter is connected with at least one electrode of the light switch and the digital input side of the converter is connected with a byte generator containing at least one memory, the byte generator delivering words formed from digits.

21 Claims, 5 Drawing Figures

OTHER PUBLICATIONS

Schmidt et al., "Electro-Optically Switched Coupler . . . LiNbO$_3$ Waveguides", Applied Physics Letters, vol. 28, No. 9, May 1, 1976, pp. 503-506.

Papuchon et al., "Electrically Active Optical Bifurcation: BOA", Applied Physics Letters, vol. 31, No. 4, Aug. 15, 1977, pp. 266-267.

Kogelnik et al., "Switched Directional Couplers with Alternating $\Delta\beta$", IEEE Journal of Quantum Electronics, vol. QE-12, No. 7, Jul. 1974, pp. 396-401.

Blum et al., "Monolithic GaAs Circuit Elements for Integrated Optics", Jan. 1976, Integrated Optics Conf., Salt Lake City, Utah, pp. MA4-1–MA4-3.

Joel, Jr., "On Permutation Switching Networks", The Bell System Technical Journal, May-Jun. 1968, pp. 813-822.

Schmidt et al., "Efficient Waveguide Switch/Amplitude Modulator", Optics Letters, Feb. 1978, vol. 2, No. 2, pp. 45-47.

Goldberg et al., "Silicon Photodiode for Optical Channel Waveguides", Applied Physics Letters, vol. 37, No. 2, Jul. 15, 1980, pp. 195-197.

Carenco et al., "Monolithic Integration . . . Bistable Operation", 6th European Conf. on Optical Comm., York University, U.K., Sep. 1980, IEE Pub. 190, pp. 252-255.

Wilt et al., "Low Threshold Be Implanted (GaAl) As Laser on Semi-Insulating Substrate", IEEE Journal of Quantum Electronics, vol. QE-16, No. 4, Apr. 1980, pp. 390-391.

"Guide Promises Low Losses for Optoelectronic ICs", Electronics, Jun. 2, 1981, p. 33.

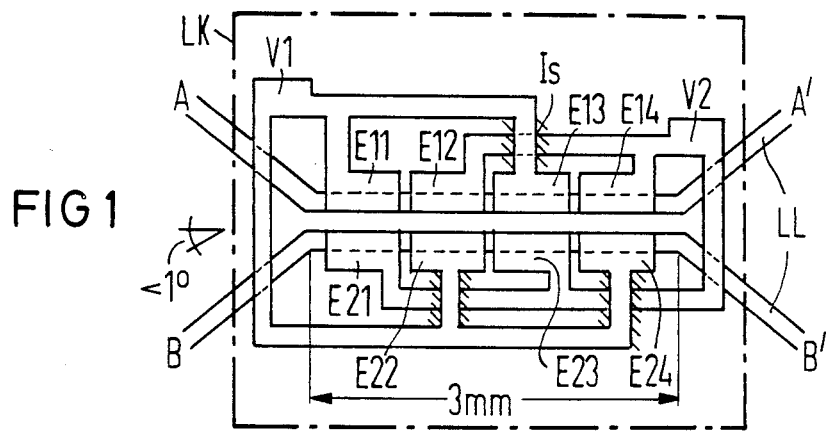
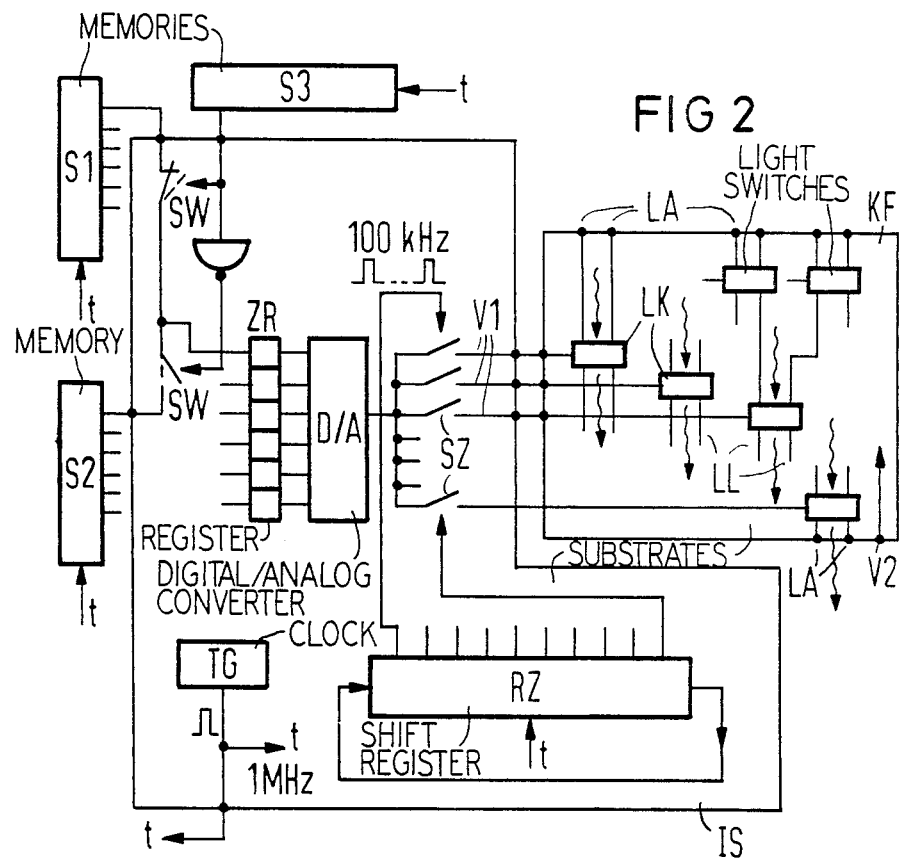

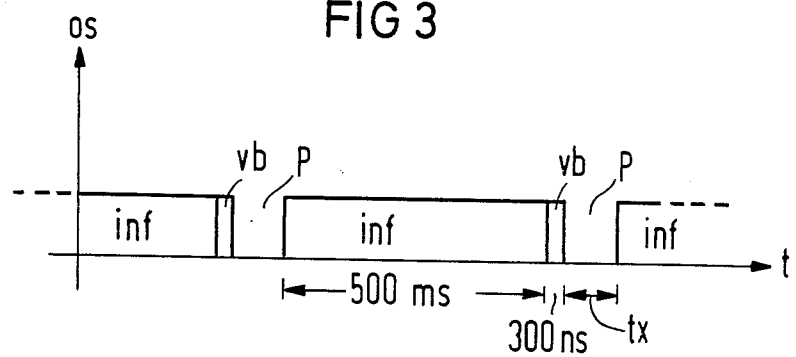

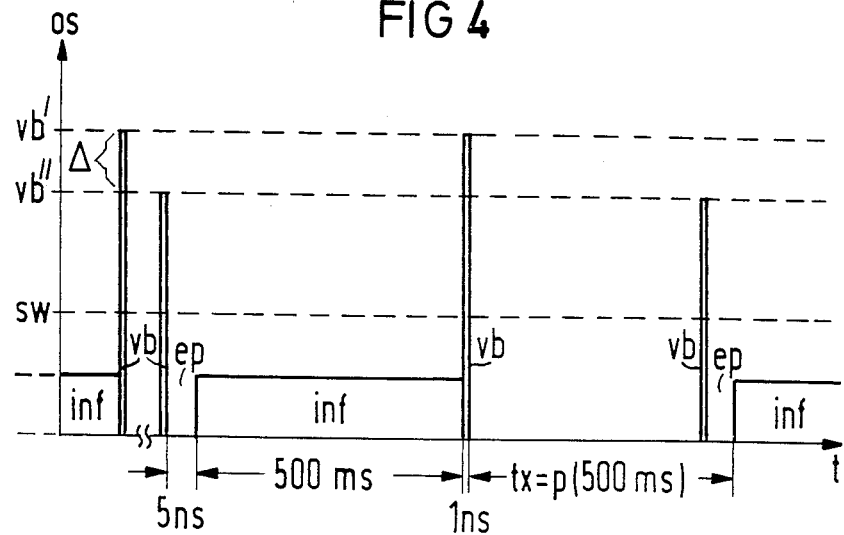
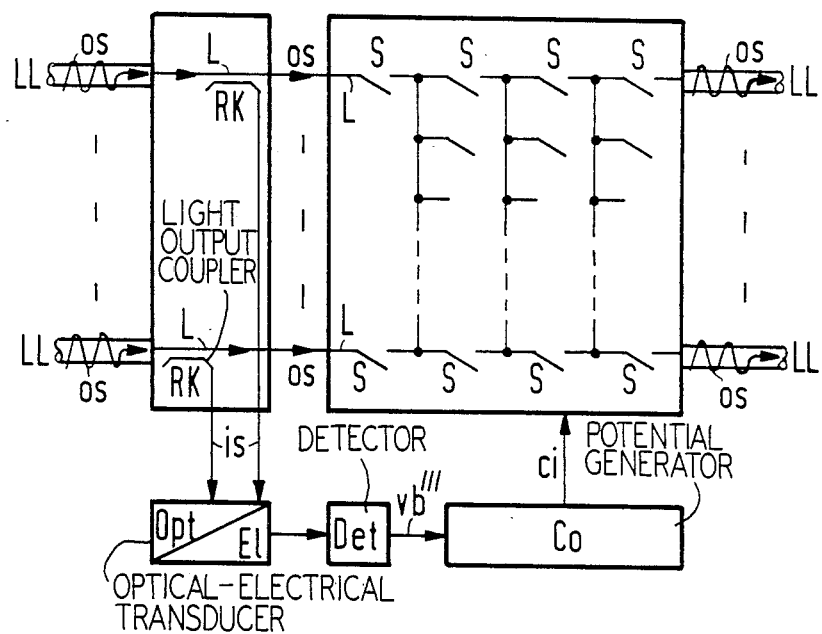

METHOD AND ARRANGEMENT FOR CONTROLLING A LIGHT SWITCH FOR OPTICAL SIGNALS

BACKGROUND OF THE INVENTION

1. Field of the Invention

The present invention relates to an optoelectronic arrangement and a method for operating the same, in particular a specific control arrangement for one or more light switches for optical signals guided in a light waveguide, applied on a first substrate, for example consisting of gallium arsenide or lithium niobate, and designed as a directional coupler having two light waveguides arranged in parallel and closely adjacent one another along a switching path which is capable of through-connecting or cross connecting.

2. Description of the Prior Art

The present invention was developed, in particular, for the control of a plurality of light switches which are manufactured on a single first substrate in integrated technology and, in particular, are to serve as crosspoints of a switching network having purely optical links in a telephone exchange system. However, in addition, the invention can also be employed in other technical fields of application, for example, for controlling light switches in computer technology and in other systems and apparatus transmitting or processing signals, primarily in case there must be individually supplied to each of the different light switches, for example brought about by manufacturing tolerances, a differently great electric control voltage of a precisely-adjusted amplitude.

Electrically-controllable light switches are per se constructed in various manners, primarily depending upon the type of through-connection required. In light switches constructed in the form of directional couplers, through voltage-dependent light velocity changes, the correspondingly co-changed cross couplings between two light transmissions, most frequently closely adjacent and extending parallel to one another, are utilized for direct or cross connection of both light transmissions. If the second parallel light transmission terminates in a light absorbing light sink, then the directional coupler cooperates like a light switch similar to the Kerr cell, viewed externally, with a single light transmission as a signal output. Moreover, there are, for example, similar to the direction of couplers, controllable light branch connections for the switching of the signals to the one or other branch connection output. Such light switches contain, respectively, one or more electrically-conducted electrodes for the control of the through connection.

Such light switches and their control arrangement, are already known and discussed in a plurality of references, whereby the light switches therein are preferably directional couplers, preferably manufactured on a GaAs base or a LiNbO$_3$ base in integrated technology, and whereby the control arrangement essentially is formed by a single frequently controllable DC voltage supply apparatus and controls a single light switch, respectively, cf. the light switches and their control arrangement in:

(1) Taylor H. F. "Optical Waveguide Connecting Networks", Electronics Letters, Vol. 10, No. 4, Feb. 21, 1974, pp. 41–43;

(2) Sasaki et al "Electro-optic Y-Junction Modulator/Switch", Electronics Letters, Vol. 12, No. 18, Sept. 2, 1977, pp. 459–460;

(3) Schmidt et al, "Experimental 4×4 Optical Switching Network", Electronics Letters, Vol. 12, No. 22, Oct. 28, 1976, pp. 575–577;

(4) Schmidt et al, "Metal-diffused Optical Waveguides in LiNbO$_3$", Applied Physics Letters, Vol. 25, No. 8, Oct. 15, 1974, pp. 458–460;

(5) Tada et al, "A New Light Modulator Using Perturbation of Synchronism Between Two Coupled Guides", Applied Physics Letters, Vol. 25, No. 10, Nov. 15, 1974, pp. 561–562;

(6) Campbell et al, "GaAs electro-optic directional-coupler switch", Applied Physics Letters, Vol. 27, No. 4, Aug. 15, 1975, pp. 202–205;

(7) Papuchon et al, "Electrically switched optical directional coupler: Cobra", Applied Physics Letters, Vol. 27, No. 5, Sept. 1, 1975, pp. 289–291;

(8) Schmidt et al, "Electro-optically switched coupler with stepped $\Delta\beta$ reversal using Ti-diffused LiNbO$_3$ waveguides", Applied Physics Letters, Vol. 28, No. 9, May 1, 1976, pp. 503–506;

(9) Papuchon et al "Electrically active optical bifurcation: BOA", Applied Physics Letters, Vol. 31, No. 4, Aug. 15, 1977, pp. 266–267;

(10) Kogelnik et al, "Switched Directional Couplers with Alternating $\Delta\beta$, IEEE Journal of Quantum Electronics, Vol. QE-12, No. 7, July 1976, pp. 396–401; and

(11) Blum et al, "Monolithic GaAs Circuit Elements for Integrated Optics", Integrated Optics Conference, Salt Lake City, Utah, Jan. 12–14, 1976, pp. MA4-1 to MA4-3, all of the above being fully incorporated herein by this reference.

A plurality of such light switches, applied on one, or on several substrates, respectively, can therefore serve as crosspoints of a switching network having purely optical links in a telephone exchange system, to which, in particular, in the above-cited publications (1) and (3), reference has been taken. Such light switches can, in an equivalent fashion, frequently replace 2×2 switches in switching networks for purely electrical signals instead of for optical signals, in particular, switches which per se are already known, for example through:

(12) U.S. Pat. No. 3,638,193;

(13) U.S. Pat. No. 3,593,295;

(14) German Offenlegungsschrift No. 1,922,891;

(15) German Auslegeschrift No. 2,036,128;

(16) German Auslegeschrift No. 2,036,176; and

(17) Joel Jr. "On Permulation Switching Networks", The Bell System Technical Journal, May–June 1968, pp. 813–822, all of which are fully incorporated herein by this reference.

Essentially, this equivalency has already been pointed out in

(18) German Offenlegungsschrift No. 3,138,979; and

(19) German Offenlegungsschrift No. 3,138,980, which were not published before the effective filing date of this document.

In addition, it is already known to control the above-mentioned light switches through control arrangements which contain transistors, or diodes, respectively, on the first substrate or on a second substrate, for example one may refer to:

(20) Schmidt et al "Efficient optical waveguide switch/amplitude modulator", Optics Letters, Vol. 2, No. 2, February 1978, pp. 45–47, particularly p. 45, left column, second paragraph;

(21) Goldberg et al "Silicon photodiode for optical channel waveguides", Applied Physics Letters, Vol. 37, No. 2, July 15, 1980, pp. 195–197;

(22) Carenco et al, "Monolithic Integration of a Detector and a Directional Coupler Switch in GaAs-Bistable Operation", 6th ECOC (European Conference on Optical Communication), Sept. 16–19, 1980, IEEE Publication No. 190, pp. 252–255, particularly p. 252, first paragraph and FIG. 3; and

(23) Wilt et al, "Low Threshold Be Implanted (GaAl) As Laser on Semi-Insulating Substrate", IEEE Journal of Quantum Electronics, Vol. QE-16, No. 4, April 1980, pp. 390–391, fully incorporated herein by this reference.

It is also already known in the art to produce a first GaAs substrate with light transmission members on a $SiO_2$ layer, for example one may refer to:

(24) Electronic Newsletter, "Guide Promises Low Losses for Optoelectronic ICs", Electronics, June 2, 1981, p. 33, fully incorporated herein by this reference.

Such optoelectronic light switches have the often interfering disadvantage that the control voltage, or the control potentials of the control voltage, respectively, frequently must be very accurate, e.g., adjusted to 1°/oo(per mille) precisely in order to obtain an optimum operation. If, in particular, the control voltage is not sufficiently precisely adjusted, then either the crosstalk attenuation between various optical guides of the light switch, and possibly the entire first substrate, is unfavorable, or other attenuations within the light transmission members are unfavorable. Particularly for the utilization of such light switches as crosspoints of a telephone exchange system having purely optical links, however, extremely high requirements must be made of the crosstalk attenuation, on the one hand, and of the passband attenuation, on the other hand, of the light transmission member.

Due to the integrated manufacturing technique and the related relatively large manufacturing tolerances, in particular, for the light transmission members, however, the respectively accurate magnitude of the control voltage, necessary for the purpose of optimum control, is quite different from case-to-case. The truly optimum magnitude of the control potentials for each of the light switches on such a first substrate can only be ascertained from case-to-case through measurements whereby, in the latter operation, for each light switch of many light switches applied on the same first substrate, respectively varying great control potentials are favorable, i.e. optimum.

SUMMARY OF THE INVENTION

The object of the present invention, therefore, is to provide apparatus and a method by which the above problem is solved, in spite of the difference of the magnitude of the optimum control potentials for the light switches, by making available control potentials which are individually very accurately adjusted in operation, for the control of the respective light switch in each instance in a very advantageous fashion, for technical applications. The present invention therefore permits, in particular, a great reduction in rejections in the manufacture of light switches in that the invention permits the making available, in a precise, rapid and readily reproducible fashion, respectively, of a specific magnitude within a wide range of per se possible control voltage magnitudes. Through the reduction of the rejection rate, the invention, additionally, and for the first time, offers an economical realization for the manufacture of such light switches and their control arrangement, in particular, for the intensive use of the same in switching networks of telephone exchange systems.

According to the invention, a control arrangement is provided for the control of a light switch, manufactured in integrated technology, for optical signals, guided in a straight line, applied on a first substrate, for example consisting of GaAs or of $LiNbO_3$, for the control of a light switch, known per se, designed as a directional coupler, with two light guides, arranged in parallel and closelyadjacent along a switching path, which are capable of being through-connected in a direct manner or in a crosswise manner, whereby there is connected to the light guide structure, for the purpose of controlling the light switch, at least one electrically-controllable, electrically conductive electrode, respectively, of the light switch. Controlled by the electric control potential on the electrode, the light, guided in the respective light guide, is switched, for example is directly through-connected from the input of the light guide to the output of the same light guide, or is crosswise through-connected, exchange between the light guides of the directional coupler. In particular, for the control of a plurality of such light switches, manufactured in integrated technology on a single first substrate, which light switches serve as crosspoints of a switching network having purely optical intermediate lines in a telephone exchange system, the invention is characterized in that, on a first substrate, for example of Si or GaAs, a digital-/analog converter, which is stablized with respect to its analog output voltage against DC voltage supply fluctuations, is provided in integrated technology. The analog output side of the digital/analog converter is connected with at least one electrode of the light switch. The digital input side of the digital/analog converter, for the purpose of controlling the light switch, is connected with a byte generator, containing at least one memory, which byte generator delivers words formed from digits.

Additional features are provided and provide additional advantages. Therefore, according to one feature of the invention, directional couplers, which, in a known fashion, require two different control potentials per control electrode, in particular a first control potential for the direct through connection and a second potential for the crosswise through connection, are operated with respectively accurately-adjusted control voltages in the case of direct through connection as well as in the case of crosswise through connection.

According to another feature of the invention, given utilization of the specific light switch of the above feature, particularly for a switching network, in automatic fashion, corresponding to need, the respective direct or crosswise through connection is adjusted.

According to another feature of the invention, the circuit arrangement is able to particularly rapidly conduct the conversion of a word into an analog value, in particular, in that the various digits of the word, in parallel instead of serial fashion, are supplied to the digital input side of the converter.

According to another feature of the invention, a plurality of light switches are supplied with optimum control potentials, or control voltages, respectively, by means of a single converter which, in particular, according to the previous-discussed feature, can be particularly rapidly operated.

According to another feature of the invention, self-discharge of the electrodes of the light switch are rendered harmless.

According to another feature of the invention, the second control potential of the various control voltages are supplied, at a minimum expense, by way of a single connection terminal.

According to another feature of the invention, the second control electrode of the light switch is supplied a control potential which is optimum for the second electrode, respectively, in a precise, rapid and easy manner.

According to another feature of the invention, a particularly high degree of integration is made possible and, hence, particularly few external connections are provided which are to be soldered together or to be otherwise connected.

According to another feature of the invention, a particularly rapid arrangement with regard to the electric control is made available, as well as with regard to the optoelectronic signal through connections.

According to another feature of the invention, by way of a heterogeneous technique, a relatively rapid, purely electric control arrangement is combined with particularly attenuation-poor optoelectronic optical guides.

According to another feature of the invention, the fabrication and the later operation of the control arrangement are rendered as simple as possible, given a heterogeneous substrate block.

According to another feature of the invention, it is possible to achieve, in a particularly simple fashion, and in spite of virtually randomly great scattering of the properties of the converter brought about by manufacturing tolerances, a precise adjustment of the control voltages through corresponding previous, e.g. one-time, adjustment.

According to another feature of the invention, it is possible to be able to reverse, or render harmless, the often quite rapid ageing of the characteristic curves of the light switches.

According to another feature of the invention, it is possible to ensure the synchronization of the polarity reversal in the case of all crosspoints of the connection paths, even if they are distributed over a plurality of substrates, and even if the plurality of separately-operating sealed generators generate the fields at the respective electrodes in each instance.

According to another feature of the invention, it is possible to render the aforementioned synchronization with particularly little hardware expense in the case of control of the field generators.

According to another feature of the invention it is possible to provide a particularly precise, rapid, simple supply of electrodes of the various crosspoints with the respective potentials whose optimum magnitude from crosspoint-to-crosspoint, because of manufacturing tolerances, is varyingly great, respectively.

According to another feature of the invention, it is possible to provide an even more accurate compensation, or elimination, respectively, of the agent of the crosspoint.

According to another feature of the invention, it is possible to provide a further improvement in the aforementioned compensation, to select the duration of the pause differently than the duration of the transmission.

Furthermore, and according to another feature of the invention, it is also possible to utilize the pause for the purpose of crosstalk-poor transmission signals modulated with data.

According to a further feature of the invention, it is possible to readily be able to recognize the polarity reversal command from the sequence of optical signals, independently of the code of these signals.

According to another feature of the invention, and through the utilization of different light flashes for the polarity reversal and polarity re-reversal, it is possible to select the duration of the two polarity reversal phases to be varyingly great, in particular to be able to select varyingly great from light flash-to-light flash, respectively. This is, in particular, variable in connection with the specific measures set forth above relating to the selection of the duration of a pause to be different than the duration of the transmission in order, through alteration of the duration of the polarity reversal phases, synchronized by the light flashes, to be able to accurately adjust the attenuation of the light switches in the direction opposite to the through-connected direction.

According to another feature of the invention, clipping of the data which are transmitted in the time slots following the light burst is avoided.

According to another feature of the invention, the light bursts are coupled-in in a particularly simple manner.

According to another feature of the invention, it is possible to able to rapidly and reliably recognize, in a particularly simple manner, the light burst, i.e. the polarity reversal command from the sequence of all transmitted optical signals.

BRIEF DESCRIPTION OF THE DRAWINGS

Other objects, features and advantages of the invention, its organization, construction and operation will be best understood from the following detailed description, taken in conjunction with the accompanying drawings, on which:

FIG. 1 is a schematic representation of an exemplary embodiment of a light switch, designed in the form of a directional coupler, and known in the art;

FIG. 2 illustrates an exemplary embodiment of a control arrangement constructed in accordance with the present invention, in particular, in utilization for the control of a plurality of light switches in a switching network of the telephone exchange system;

FIG. 3 is a graphic illustration of a series of blocks of modulated optical signals;

FIG. 4 is a graphic illustration of a simple example of the transmitted optical signals, together with polarity reversal commands, formed through light bursts; and FIG. 5 is a schematic representation of an exemplary embodiment of the invention as applied to a switching network of an exchange system.

DESCRIPTION OF THE PREFERRED EMBODIMENTS

Referring to FIG. 1, a known light switch LA is illustrated as being constructed in the form of a directional coupler comprising two light paths LL, more specifically A—A' and B—B'. In this instance, the light paths LL extend parallel and closely adjacent for a length of approximately 3 mm, for example, and the arrangement is provided with eight electrically-controllable electrodes E11–E24. The electrically-controllable electrodes are arranged in pairs and are connected in tandem over the parallel section of the light paths LL, as well as alternately, respectively, controlled by a first control potential V1 and by a second control potential V2. Insulating layers Is spatially separate the electrically-conductive leads of the control potentials V1 from the leads of the control potentials V2 as the locations indicated by the oblique lines. In a manner known per se, these control potentials V1 and V2 influence the light velocity in the light paths which are, for example, light waveguides. In the case of specific values of the control potentials V1, V2 or of the control voltage V1/V2, a cross coupling takes place in which the signals from A to B' and B to A' are crosswise through-connected, i.e. from A to A', and B to B', high attenuations occur. Depending upon the chances during manufacture of the light switch LK, the precise optimum magnitudes of the control potentials V1 and V2, in the case of which a crosswise through-connection with high attenuation in the direct direction and in which a direct through-connection with high attenuation in the cross connection occurs, respectively, are markedly different from one light switch to the next, for example, by 1% and more, in any case one is very interested in high attenuation in the undesired through-connection direction and low attenuation in the desired through-connection direction.

Therefore, it is a question of a specific directional coupler LK, manufactured in integrated technology, for optical signals guided in at least one light guide LL. The light switch LK is secured on a first substrate KF which, for example, consists in a manner known per se, of GaAs or of LiNbO₃. Secured to the light guide, for control of the light switch LK, is at least one electrically-controllable electrically-conductive electrode, respectively, cf. E11–E24. Controlled by the control potential, here V1 and V2, on the electrodes, the light, guided in the respective light guide LL, is directly through-connected from A to A', or from B to B', respectively, or is crosswise exchanged between the light guides LL, for example through-connected from A to B', or B to A', respectively. However, in the case of the present invention, any other light switch, containing a control electrode, can be employed for the purpose of connection of optical signals guided in a light guide.

The present invention solves the problem of supplying precise control voltages, or control potentials V1, V2, respectively, depending upon the requirement of the respective light switch LK, at e.g. 1 mV precisely, in such a manner to the electrode, or to the electrodes E11–E14, that, also in the rough rapid operation, e.g. within a telephone exchange system, selectively a low attenuation in the desired through-connection direction occur; and primarily selectively a high attenuation in a non-desired through-connection direction is provided for the purpose of blocking this through-connection direction, the foregoing being ensured although the necessary, e.g. precise to 1 mV, optimum magnitude of the control potential V1 and/or V2 of light switch-to-light switch clearly exhibits respective differences of, for example, several 100 mV. Such a light switch LK therefore exhibits two optical signal inputs A, B and two optical signal outputs A', B'.

FIG. 2 illustrates an embodiment of a control arrangement constructed in accordance with the present invention which delivers the respective control voltages V1, V2, rapidly with high precision and individually adjusted for the respective light switch LK, in each instance, by way of a digital/analog converter D/A and at least one memory S1/S2/S3 which operates the converter D/A.

In the example illustrated in FIG. 2, there is applied on a first substrate KF a plurality of light switches LK each having two optical signal inputs and two optical signal outputs. These light switches LK are, partially in series, partially in parallel connected in light guides LL so that, in the case of this example, the first substrate KF can represent a section of a switching network of an exchange system. The terminals LA would supply optical signals and/or lead optical signals away from the switches therefore represent inputs and/or outputs of the switching network section KF. All of the light switches LK are, in this example, controlled by a single control arrangement.

On a second separate substrate IS a plurality of elements pertaining to the control arrangement are provided, namely S1, S2, S3, S4, ZR, D/A, SZ, RZ and TG, or at least a portion of such control arrangement elements, primarily D/A, and also, for example, SW, ZR, SZ, RZ, TG as illustrated in FIG. 2. The second substrate with its elements of the control arrangement can, as explained below, also be identical to the first substrate KF, so that, in this special instance, both substrates KF/IS represent a single homogeneous or heterogeneous substrate block instead of two substrates connected via external lines. On the second substrate IS, in accordance with the invention, in particular, the digital-/analog converter D/A is constructed in integrated technology, which, with respect to its analog output voltage, is stabilized with respect to DC voltage supply fluctuations. Independently of such fluctuations, therefore, the converter D/A delivers precise analog control potentials V1 and V2 to the electrodes of the respectively activated light switch LK.

The analog output side of the converter D/A, in this example, is electrically conductively connected with the electrodes E11–E24 of the various light switches LK via cyclically-actuated intermediate switches SZ. To this end, the intermediate switches SZ, for example, with 100 kHz, are cyclically successively briefly conductively operated by way of a clock TG which generates, for example a 1 MHz pulse train and by way of a shift register, or ring counter, RZ. In this manner, the converter D/A can supply not only a single light switch, but many light switches, for example ten light switches, with control potential V1 and/or V2.

The digital input side of the converter D/A, for the purpose of control of the plurality of light switches LK, is connected with a light generator, containing at least one memory, here three memories S1/S2/S3 with an intermediate register ZR, the clock TG and the ring counter or shift register RZ. The byte generator delivers words formed from digits to the digital input side of the converter D/A. From such a word, the converter D/A, which is non-sensitive to interferences, can precisely and rapidly generate those analog control potentials V1 and/or V2 which control the respectively activated light switch LK, individually determined for the latter, with correspondingly high precision. It is favorable to here employ such a code for these words which, in jumps which are as small as possible, permit the adjustment of the optimum magnitude of the control potential V1, or V2, respectively, on the electrode, whereby frequently a linear coding, i.e. uniform quantizing is here often better than a logarithmic coding (non-uniform quantizing). The analog output voltage of the converter D/A then represents the control voltage, or the control potential V1 and/or V2, respectively, which is supplied to one of the light switches LK individually, respectively, corresponding to its requirement. In the memory of the byte generator, here in the memories S1/S2, in the illustrated example, many such words are stored which, read successively, are intermediately stored in the intermediate register ZR, so that, in a particularly time-saving manner, the next interrogation cycle within the memories S1/S2 can begin although the last-read word, intermediately stored in the intermediate register ZR stands ready yet a longer period of time for the generation of the corresponding analog voltage on the analog output side of the converter D/A. Associated with each light switch LA, in this example, is one word in the first memory S1 and one word in the second memory S2. The word stored in the first memory S1 represents the, for example, binary-coded word which corresponds to the control voltage, or to the control potential, respectively, e.g. V1, for direct through-connection of a specific light switch LK from the plurality of light switches LK. In the first memory S1 there are here preferably stored so many binary-coded words for direct through-connection as the number of light switches, which are activated by one and the same converter D/A cyclically successively via the intermediate switches SZ. In a corresponding fashion, in the other, second memory S2 are the words, for example again binary coded, which are stored which respectively correspond to those other control potentials inter alia, again V1, which are to be delivered, for the crosswise through-connection, to the same electrodes of the respective light switch LK. There is supplied to the same electrode, for example the electrode E11, of the respective light switch activated via one of the intermediate switches SZ from the converter D/A, that control potential, here $V1_{dir}$ or $V1_{kreu}$ which potential corresponds either to the direct through-connection direction (i.e. the word stored in the first memory S1), or to the crosswise through-connection direction (i.e. the word stored in the second memory S2), depending upon which of the two selection switches SW is at that moment conductive, one of such switches always being conductive while the other one blocks.

The selection switches SW can also automatically be controlled by way of the third memory S3, e.g. secured in the central control unit of the exchange system, the memory S3 storing whether the switching state of the activated light switch is direct or crosswise. Dependent upon this switching state, stored in the third memory S3, the light switch LK, respectively activated via an intermediate switch SZ, is directly through connected by the word associated with the latter from the first memory S1, or crosswise through-connected from the word individually associated with the latter from the second memory S2. The two memories S1, S2, or additional such memories can, in addition, once again in the same number, contain further coded words wnich correspond to the second control potential V2 on another electrode of the light switch LK, cf. E21, and which can be generated per se from such further words through the same converter D/A or through an additional such converter D/A. For the generation of a second control potential V2, therefore, a separate second converter D/A can be constructed, or a variable potential, occurring on a second wire of a two-wire output of the converter D/A, can be utilized.

Basically, however, also another organization of the storage of the words in the various regions of memories is possible instead, as just described, storing such words for direct through-connection in the memory S1 and for crosswise through-connection in the memory S2. The nature of the core of the invention is not altered by how the storage is organized. It is significant that at least one coded stored word, via at least one converter D/A, generates at least one analog control potential V1 and/or V2 which, in turn, serves the purpose of control of at least one light switch LK.

Therefore, due to the fact that on a second substrate, e.g. of Si or GaAs, a digital/analog converter is applied in integrated technology and stabilized with respect to its analog output voltage against DC voltage supply fluctuations, that the analog output side of the converter is connected with at least one electrode of the light switch, and that the digital input side of the converter, for control of the light switch, is connected with a byte generator, which delivers words formed from digits, therefore a precise optimum rapid adjustment of the respective light switches is rendered possible, independently of what specific light switch is concerned.

In the case where the light switch is a directional coupler having parallel-arranged light guides, the byte generator can contain two memories of which the first memory stores words which correspond to the direct through-connection of the respective light guide of the light switch, and of which the second memory stores words which correspond to the crosswise through-connection to the other light line of the light switch. Therefore, in an uncomplicated manner, by means of one and the same converter, the supply of the respective electrode with optimum control potentials for direct as well as for crosswise through-connection is possible. If here additionally the byte generator contains yet a third memory in which, for example, it is stored in binary fashion whether the first memory or the second memory is to deliver a word to the digital input side of the converter, and in case additionally the output of the third memory is respectively connected with the control input of at least one selection switch, inserted between the first memory and the second memory, on the one hand, and the digital input side of the converter, on the other hand, it is possible, and in an automatic fashion, corresponding to requirements, for example, directly by the central control unit of the exchange system, corresponding to the respective path finding result, for the direct crosswise through-connections to be adjusted. If then additionally, per parallel-transmitted digit, a selection switch is applied between, in each instance, the first and/or second memory and the converter, a particularly rapid new adjustment of the respective light switch is possible; in particular, the adjustment is even more rapid if, between the selection switches and the digital input side of the converter, a memory cell of an intermediate register is respectively insulated which, in operation, intermediately stores the word controlling the light switch so that, in the first and second memory, already the next interrogation occurs although the converter is still being controlled by the previously-connected word.

A converter can rapidly deliver to many light switches respectively individually associated optimum precise magnitudes of control potentials if the analog output side of the converter, via a plurality of cyclically successively-actuated intermediate switches, is connected with the electrodes of the various light switches, thereby activated in the same manner cyclically in succession, preferably applied on one and the same first substrate. Per se, the self-discharge of the activated electrodes is most frequently low; however, it can be, even entirely, compensated in that the cyclic activation of the light switches, attainable by the intermediate switches, as a rule, represents a refresh cycle which eliminates the self-discharges of the electrodes which occurred since the last activation.

In case, with a control arrangement of the present invention having a plurality of light switches on the first substrate, the second potential V2, cf. FIG. 2, of the control voltages respectively controlling the light switches is supplied for all light switches on the first substrate via a single common control input, the expense for the second control potential is particularly low. The values for the attenuations of the light switch LK, however, can even be further improved in that the second control potential V2, in principle, just like the first control potential V1, by way of a word converter in a digital/analog converter, is in each instance additionally generated, in particular, in an additional digital/analog converter, or, in principle, even in the same digital/analog converter which serves the purpose of generating the first control potential, in particular, in case the converter simultaneously exhibits two analog output connections.

Particularly few lines need be connected, i.e. soldered or welded, if the first substrate KF and the second substrate IS are common and form a single substrate whereby the control arrangement, or at least a portion of the control arrangement, is applied on the same substrate IS/KF as the light guides LL and the light switches LK. A particularly high speed of the control arrangement and easy manufacture is attainable if the substrate IS/KF, in a manner which is known per se in principle, represents an essentially homogeneous body, for example, manufactured on a GaAs base. A high speed of the control arrangement with particularly favorable attenuation values of the light guides and of the light switches, however, is achieved if the substrate block IS/KF represents an essentially heterogeneous body in which the second substrate IS, for example formed from Si or GaAs is applied in thin film technology on the first substrate KF, formed, for example, from GaAs or, primarily, from $LiNbO_3$. The manufacture of such a heterogeneous substrate block is facilitated and also the electric insulations between the two substrates of the block, often necessary, is facilitated in that the first substrate IS is separated from the second substrate KF in the substrate block IS/KF by a thin insulating intermediate layer which, for example, is formed from $SiO_2$.

In spite of great straying of the properties of the converter, also brought about by manufacturing tolerances, in a particularly simple manner, a precise optimum adjustment of the control potentials can be achieved through a, frequently, only one-time check of each light switch in that the respective optimum potential V1, V2, of the control voltage V1/V2, in which the crosstalk and/or the attenuation of a respective light switch LK is optimum, is ascertained through variation of the words delivered to the digital input side of the digital/analog converter D/A, and that subsequently the word corresponding to the optimum is stored in the byte generator S1, S2. Independently of the manufacturing tolerances of the light switches and of the converter, then the operation which is respectively optimum for these light switches and for this control arrangement is adjusted in the most rapidly-reproducible manner, whereby the reject quota for this manufacture of substrates having integrated light switches and control arrangements, in addition, is comparatively very small. Therefore, a particularly great chance for economic utilization of the light switches formed in integrated technique is achieved in spite of the very high requirements of the attenuations and of the manufacturing expense.

A special feature of the invention, described in the following, proceeds from a specific optoelectronic method, namely from the specific method for the control of the optoelectronic crosspoints of an exchange system which has intermediate guides representing light guides for transmitting purely optical signals. This feature of the method is closely related, regarding problem and solution, in spite of the parallel arrangement, with the solution and problem corresponding to the control of a light switch LK, or a plurality of such light switches LK, as discussed above, and shall be further explained below. Such a method proceeds, for example, from the aforementioned reference (25) German Offenlegungsschrift No. 3,147,109, from the reference (18) German Offenlegungsschrift No. 3,138,979 and the reference (19) German Offenlegungsschrift No. 3,138,980, and from the aforementioned publications (1) Taylor and (2) Sasaki et al. In addition, a plurality of literature regarding light switches and their controls, which for example contain transistors, or diodes, respectively on the first substrate or on the second substrate, is known, cf. for example, the references (2) and (4)–(11) mentioned above. A plurality of such light switches, applied on one, or on several, respectively, substrates, therefore can serve as crosspoints of a switching network having purely optical intermediate lines in a telephone exchange system, to which, in particular, reference has already been made in the above-mentioned documents (1), (3), (18), (19) and (25).

Such optoelectronic light switches can frequently, in equivalent fashion, replace 2×2 switches in switching networks for purely electrical signals instead of for optical signals; namely, switches which are per se known in the art, e.g. from the references (12)–(17).

Such optoelectronic light switches have the often occurring interfering disadvantage already described by Schmidt et al in reference (3), that the control voltage, or the control potentials of the control voltage, respectively, indeed must frequently be precisely adjusted in order to obtain an optimum operation, but that, according to Schmidt et al, a rapid ageing of the light switch occurs which requires a constant polarity reversal of the field of the electrodes after, for example, 500 ms, respectively, or which requires a, in any case extensive, continuous alteration of the potentials of the electrode for the purpose of elimination, or compensation, respectively, of the ageing process. If, in particular, the control voltage is not sufficiently precisely adjusted, then neither the crosstalk attenuation between various optical guides of the light switch, and possibly of the entire first substrate, is unfavorable, or other pass band attenuations within the light guides are unfavorable.

Particularly for the utilization of such light switches as crosspoints of a telephone exchange system having purely optical intermediate lines, high requirements must be made of the crosstalk attenuation, on the one hand, and of the pass band attenuation, on the other hand, of the light guides. Moreover, a constantlyincreasing continuous alteration of the potentials of the electrodes in the permanent alteration of the crosspoints of the exchange system is too costly and unreliable since, in such an exchange system, clear operating condition which are constantly simple to reproduce must prevail because of the narrow tolerances to be observed which are required by the system owner.

The interruptions of the connection path during switching and during compensation of the ageing, therefore, should be made as small as possible. This is achieved by the present invention in that the polarity of the fields of at least a portion of the electrodes is reversed from time-to-time, for example, after 100 ms, for the duration of a pause, for example of 10 ms, and that the polarity of the fields, at least in the case of all crosspoints, manufactured on the same substrate, of a through-connected connection path, triggered by a polarity reversal, forming a time mark and modulated onto the optical signal, is at least approximately simultaneously reversed, i.e. primarily through an accurate synchronization of the polarity reversal of all crosspoints, if possible, which through-connect a connection path. The amount of the control voltage between the electrodes of the respective crosspoints can therefore be differently selected during the "pause", for example, higher than the amount of the control voltage between the electrodes during the transmission of optical signals in the through-connecting state of the connection path. The shorter the pause in comparison to the transmission duration, the higher the amount of the control voltage during the pause must be in comparison with the amount of the control voltage during the transmission. During the polarity reversal, the respective connection path can be interrupted, or it can be in an undefinable state, with small crosstalk attenuation, although, through a corresponding selection of those amounts of the control voltages during the "pause" with polarity reversal, also again the same connection path can be through-connected as during the "transmission". If one respectively accurately selects the control voltages and the ratio of the periods for the "transmission" and for the "pause" then, even during the "pause", the same connection path as during the transmission is through-connected, as a consequence of which also during the "pause", in which the respective fields are reversed in polarity, an additional, crosstalk-poor transmission via the same connection path becomes possible. The "pause" can, however, then also be exclusively employed, for example, for the transmission of dial tones, dial pulses, fees, counting pulses, and other data for the control and monitoring of the exchange system.

FIG. 5 illustrates, in conjunction with the FIG. 3, an example of an arrangement for a method for controlling the optoelectronic crosspoints S of an exchange system which transmits purely optical signals os, for example, between a plurality of glass fibers LL, applied on the input side and on the output side. The intermediate lines L, disposed between the crosspoints S, and the input and output guides LL, applied on the switching network external connections, here respectively represent light guides conducting optical and not electrical signals. The crosspoints S are disposed respectively in integrated technique on a substrate KF or, distributed over several such substrates KF, which, for example, can consist of GaAs or $LiNbO_3$. The coupling points S are formed by light switches which contain electrically activatable electrodes for the purpose of switching the optical signals os and which, to this end, with the electrodes, by way of an electric field, act on the light guides L manufactured in integrated technique on substrate KF in that the respective electric field influences the light speed in the respective light guide L and hence influences the switching state of the light switch S.

Longer-lasting interruptions of through-connected connection paths can be avoided, an interfering mutual influences of the light switches among one another can, because of the minimizing of the potentials between various light switches during the actual through-connection of the connection path, be reduced in that the polarity of the field of at least one portion of the electrode from time-to-time, e.g. after 100 ms or only after 500 ms, respectively, is reversed for the duration tx of a pause p, and that the polarity of the field, at least in the case of all crosspoints S manufactured on the same substrate KF, of a through-connected connection path, at least approximately, is synchronized and hence reversed by means of an optical polarity reversal command vb, Transmitted with the optical signals os. The respective polarity reversal command vb can also effect the synchronization of the polarity reversal in the case of not only a single, but even in the case of a plurality of such connection paths. The interruption of the connection path during this entire or at least extensive elimination of the ageing is correspondingly synchronized and therefore relatively short-lived. Since all light switches S are simultaneously treated with respect to ageing, the potential differences between adjacent light switches S are respectively minimal and hence the mutual influences are minimal in that one synchronously reverses, in polarity, spatially-adjacent connection paths, or all connection paths if possible. The optically-transmitted polarity reversal command thus permits, in spite of possibly large distances with long glass fiber distances LL between various telephone exchanges, or exchange systems, the attainment of a synchronization of the polarity reversals in all exchange systems, even if each of the systems for the purpose of path finding, per se, is controlled by a separate computer.

It is possible to outcouple one portion of the energy, for example 1%, of the optical signal os from the through-connected connection path (e.g. by way of a correspondingly-controlled light output coupler RK, operated as a directional coupler, in order to outcouple the polarity reversal commands vb, controlling the synchronization of the polarity reversals, from the transmitted optical signals os. As indicated in FIG. 3, the optical signal os preferably contains normally no longer, marked, specific sequences vb of digits, e.g. not only "1" bits or not only "0" bits or e.g. not only 10000001 bytes. Such a longer specific sequence vb, e.g. lasting 300 ns, of digits, nevertheless outcouples from the connection path, identified in a detector Det, then represents the polarity reversal command vb for the reversal of the polarity of the fields of the electrodes, at least for the light switches S on the respective substrate KF along the respective through-connected connection path. During a pause P following the polarity reversal command vb (cf. FIG. 3), i.e. between two transmissions of the optical signals os, modulated with subscriber data inf, the polarity of the electric field is thus reversed at the respective electrodes by a corresponding reversal of the field generator, or potential generator Co, respectively, which, given a reasonable magnitude of the potentials ci, delivered by the generator Co, entirely or largely eliminates the ageing of the respective light switches. The pause P, therefore, respectively divides the transmitted optical signal os, modulated with subscriber data inf into blocks, for example of approximately equal duration, according to FIG. 3, for example, of 500 ms duration, respectively.

Depending upon the type of that polarity reversal command vb, particularly depending upon the type of that sequence vb, various methods are applicable for the identification of a polarity reversal command vb in the detector Det. Particularly low in expense is a method in which the optical signal os, modulated with subscriber data inf, for example, transmitted with bit rates of 200 MHz, is modulated according to the HDB3 code and in which the sequence vb of, then preferably identical, digits (which then thus can consist of only "0" bits or of only "1" bits) is transmitted immediately prior to the beginning of the pause P. The outcoupled optical sequence vb can then, particularly, be converted in the optical-electrical transducer Opt/E1 into an electrical sequence vb and can be paired in the detector Det with the output signals of a synchronously-operated oscillator by way of a logic circuit checking coincidences and digit patterns. This comparison is particularly readily possible if, on the one hand, the sequence vb contains only identical digits, for example, only "1" bits, and if the oscillator, at the latest upon beginning of the sequence vb, has been forcibly synchronized with the time clock pulse of the digits of the sequence vb. The comparison results, i.e. the output signals of the logic circuit, can be counted in a counter of the detector Det, whereby a count result, which exceeds the limit value corresponding to the length of the sequence vb, causes the potential generator, i.e. the "field generator" Co, delivering the potential ci for the fields, to change the polarity of the field, i.e. to deliver the field of reverse polarity, whereby, however, a count result not attaining this limit value causes the field generator Co to continue to deliver the fields, or the corresponding potential ci with the present polarity. A comparison result, which corresponds to the lack of a digit in the train of the counted sequence, immediately resets the counter to zero, i.e. indicates that the sequence vb has not yet arrived in the detector Det.

The duration tx of the pause P can therefore be the same or different, particularly shorter, than the duration of the transmission of data inf, assumed in FIG. 3 as approximately 500 ms. The shorter the pause P, the higher the amount of the control voltages ci at the electrodes of the light switches S must be in order to cancel their ageing. However, also polarity reversals of the fields with, for example, respectively 500 ms of the one and then respectively 500 ms of the other polarity, however, approximately the same amount, as known through Schmidt et al in reference (3), are applicable in the case of the present invention. Therefore, the invention permits, depending upon requirement of the duration of the transmissions inf and the duration of the pause P, the most diverse modes of operation.

A further feature of the invention solves the additional problem, in spite of the differences of the magnitude of the optimum control potentials, or control voltages cl, respectively, for the light switches S during the transmission inf and during the pause P, to make available control potentials ci, in operation individually very precisely adjusted, for the control of the respective light switch S in each instance in a very expedient fashion for technical applications. Moreover, this further development permits the reject quota, at least during manufacture of the light switches S, if not also during the manufacture of the field generator Co, in particular, applicable on the same substrate, possibly also of the detector Det and the opticalelectrical transducer Opt/E1, to be strongly reduced in that this further development makes available, respectively, precisely, rapidly and readily reproducibly, a specific magnitude ci within a further tolerance range of the most diverse control voltage magnitudes ci. Through the reduction of the reject rate, this further development additionally offers an economic, particularly favorable chance for the manufacture of the light switches S and their control arrangement Co/Det/Opt/E1, in particular, for the intensive utilization of the same in switching networks of telephone exchange systems.

According to this feature of the invention, the field generator Co, supplying the electrodes with the electric fields, converts digital words, stored in a memory, by way of a digital/analog converter, into analog electric potentials ci which are supplied to the electrodes, the potentials ci generating the fields. In particular, and to this end, in the field generator Co, a digital/analog converter is provided and is stabilized with respect to its analog output voltage ci with respect to DC voltage supply fluctuations. This structure can be applied in integrated technology, whereby the analog output side of the converter is electrically connected with at least one electrode of the just-controlled light switch S, and whereby the digital input side of the converter, for the purpose of controlling the light switch S, is connected with a byte generator which contains at least one memory for delivering the words formed from digits. The detector Det controls this memory in such a fashion that the latter, synchronized by the polarity reversal commands vb, delivers words corresponding to the polarity. One can even, with such a field generator Co, by way of switches operated in time-division multiplex fashion, control a plurality of light switches, whereby then each light switch S then receives a different control voltage ci which is typical of that light switch.

The respectively optimum magnitude of the control voltage, or control voltages, ci is even more precisely delivered if one takes into account the ageing of the respective controlled light switch S during the duration of a single block inf of optical signals (in the example illustrated in FIG. 3 this duration amounts to 500 ms) in that one takes into account the slight change of the optimum magnitude of the potential ci occurring during this interval. Therefore, in the case of this method, the delivered potential ci is altered during the duration of the block corresponding to the change of the optimum magnitude. To this end, e.g. the characteristic curve of the digital/analog converter D/A and/or the respective digital word, respectively generating the analog potential ci, and supplied to the digital/analog converter D/A, during the transmission of the block inf of optical signals modulated with subscriber data, can be continuously altered, or altered in small jumps, and hence de facto continuously altered. For example, the respective word which corresponds to the analog value ci, can be largely continuously increased or decreased in that the word, e.g. by way of an adder or subtractor is altered at its lowest value locations gradually respectively during the duration of the block inf.

A particularly precise control voltage ci can be supplied by the digital/analog converter if, during the transmission of an information block, cf. inf in FIG. 3, at all or in individual various times, respectively the attenuation of the light switches S in their non-transmissive blocking transmission direction is continuously measured and the measurement result is employed for the purpose of control, i.e. alteration, of the control voltage ci. This measurement is possible for example if, by way of at least one coupler, or optical receiver, respectively, which is inserted in a branch of the through-connected connection path, which branch is not through-connected to the connection path, the intensity of the, per se undesired, coupling of this branch to the connection branch, is frequently measured, if not constantly measured. This measured intensity of the coupling is utilized for the purpose of alteration of the characteristic curve of the converter and/or of the respective digital word generator. The optical receiver can therefore be directly connected to an intermediate line L of the switching network, the intermediate line being close to the respective light switch S, or also to the respective switching network output line LL. The measurement result can preferably cause a control computer of the switching network to systematically alter the characteristic curve of the digital/analog converter and/or the respectively controlling digital word upwardly or downwardly until the optimum of this magnitude of the control voltage ci have been found. For this measurement also standardized measurement bursts can be employed, for this purpose inserted into specific time slots of the information block inf, as a consequence of which a measurement becomes even more precise, in particular, entirely independent of the number of existing connections which are through-connected via the connection path, and entirely independent of the analog amplitude of the data transmitted in the connections as well as de facto independent of the code employed for the transmission.

In a corresponding manner, also during the pause P, through pertaining digital words and through continuous alteration of these words and/or of the characteristic curve, a high degree of stability of the switching state of the light switches S during the pause P can be achieved.

In alteration of the characteristic curve of the digital/analog converter D/A amounts to an alteration of the assignment of the digital words to the analog output signal ci of the digital/analog converter D/A. Recently, in terms of hardware, it is more simple, or more reliable, respectively, and more precise, to alter the digital words themselves, particularly to numerically multiply the words with a factor corresponding for example to the transmission duration/pause duration ratio, for example in order to generate from the word controlling the transmission the word controlling the pause.

In the case of specific control voltages ci, dependent upon the type of light switch employed, during at least one portion of the pause P, per se the same connection path can be employed during the pause P, again with optimum attenuation values, in the same manner and principle, for an additional transmission of an additional information block inf. Suitable amounts for the control voltages ci are apparent from Schmidt et al and Kogelnik et al in the cited references (8), (10) and (20). Therefore, in summary, it can be stated that the invention, including its further features and developments, is suitable for exchange systems with traversing optical systems in which the exchange functions are assumed by substrates having matrices consisting of light switches.

Integrated light switches on the basis of the electro-optical effect exhibit ageing phenomena, in particular a drift due to the charge carrier generation, or charge carrier migration, in the substrate crystal. Through periodic polarity reversals of the control voltage, or through its polarity reversal, respectively, this effect is avoidable. During the polarity reversals, however, the information flow on the connection path is interrupted. It is therefore preferred to apply a transmission method which permits an adaptation of the transmission method to the periodic polarity reversal without significant loss of data which, furthermore, permits the avoidance of a pulse deformation in the case of pulse code modulated (PCM) data, since optical regenerators are presently problematical, and in which, moreover, the transmission bit rate of the advancing development is readily adaptable. This is provided in the case of the present invention.

The control of the light switches can occur relatively simply with essentially rectangular potentials of a frequency $f \geq 2$ Hz. Depending upon the light switch principle, at one or several of the electrodes of a light switch, respectively alternatingly, positive, or negative, respectively, potential is connected, whereas at its remaining electrodes, e.g. ground potential is fixedly connected or e.g. rectangular potentials of opposite polarity are connected. In particular, also the potentials of the electrodes, in a manner known per se, can be exchanged given a frequently virtually equal amount of the control voltage, in order to through-connect the connection path. In all instances, the direction of the field of the electrodes is regularly reversed in polarity by way of an optical polarity reversal command in order to eliminate ageing. This polarity reversal can preferably be controlled as follows. In the optical information current, e.g. every 0.5 seconds, a marked polarity reversal command bit, or a plurality thereof as a sequence, is faded in. Its appearance causes the control to reverse the polarity of the potentials. The polarity reversal command bit traverses the entire optical transmission path. Therefore, the polarity reversal of the field becomes synchronizable over the entire transmission path, independently of the respective length of the optical connection path.

The optical transmitter of the path transmits, following the polarity reversal command bit, a brief time interval, referred to above as the pause P, e.g. no information. This pause serves then only for the purpose of polarity reversal of the fields. In the pause, however, transmissions can be achieved. This pause, together with the transmitted data and the signalization such as dial signals, can be classified in a superframe structure of the exchange system.

For the information on the entire distance, a code can be employed which normally comprises no longer "0" or "1" digit sequences, for example the HDB3 code. By contrast, the polarity reversal command bit sequences then form, for example, an uninterrupted sequence of "0" or "1" digits. A simple identification of the same in a detector is thereby possible. Before, or in the switching network, e.g. by way of a directional coupler, a portion of the incoming power of the optical signals is blocked out and, following the optoelectronic conversion, processed in the control portion of the exchange. This control portion, in particular, causes, upon arrival of the polarity reversal command bit, or a sequence thereof, that simultaneously the polarities of the fields in all the light switches of the respective connection path become exchanged. In the case of computer-controlled exchange systems this is also possible with the aid of the connection path plan stored in the computer in that the computer can then jointly assume the functions of the detector and even of the field generator.

In order to avoid losses of subscriber data during the pause and/or during the transmission of the polarity reversal command bits, modulated onto the optical signal, the subscriber data can also be chronologically correspondingly compressed prior to the transmission and, after transmission, can again be chronologically expanded, for example with a method which is similar to or the same as the method set forth in the transmission methods of:

(26) German Pat. No. 1,245,438;
(27) German Pat. No. 1,279,768; or
(28) German Offenlegungsschrift No. 2,902,897.5.

The objective of the now-explained further development is, through an additional measure, which is easy to execute and requires only a short duration, to be able to readily eliminate, or recognize, the polarity reversal command from the sequence of transmitted optical signals. The invention, in addition, is intended to permit the ability to employ random codes, instead of the HDB3 code, for the transmission of the optical signals formed by digits and modulated with the subscriber data, for the purpose of interference-poor recognition of the polarity reversal commands.

This objective is achieved through certain measures, i.e. in the last analysis, primarily through the utilization of a brief, particularly intensive light burst as a polarity reversal command.

In FIG. 4, the particularly high, brief-duration polarity reversal commands vb are illustrated. They have for example three to six times the amplitude of the remaining transmitted optical signal inf. The duration of these light flashes vb amounts for example to only 1 ns.

Accordingly, therefore the polarity reversal command vb is formed by such a brief light flash which is clearly more intensive than the maximum light intensity of the optical signals inf, modulated with data. These particularly intensive light flashes, because of their high amplitude, are readily recognizable as such within the totality of the signals os and are capable of being filtered out, cf. FIG. 5. Because of this easy recognizability it is now harmless if, during the duration of the transmission of data inf, the light intensity always amounts to zero, for example because at that time no data are transmitted by way of the respective time slots. The polarity reversal commands vb, formed through light flashes, are therefore very readily recognizable even in the case of interferences during the transmission of these signals inf, even if no HDB3 code is employed.

FIG. 4 illustrates an example in which the light flashes vb exhibit two different amplitudes, cf. vb' and vb". The light flashes therefore differ from one another through the difference of these two amplitudes illustrated in FIG. 4. In this manner, for the polarity reversal (in the one direction) a light flash of the one amplitude vb' can be employed, and for the return polarity reversal, a light flash of the other amplitude vb" can be employed. In this manner, the various polarity reversal phases are reliably controllable through polarity reversal commands if the duration of the individual polarity phases are different, e.g. different from polarity reversal command-to-polarity reversal command, depending upon the quality of the attenuation of the light switches S in their non through-connected direction, cf. FIG. 5 and also the above discussion with respect to the use of a light coupler or light receiver to measure the intensity of the non through-connected branch and altering the characteristic curve of the converter and/or the generated digital word. In this manner, it is even possible, without alteration of the characteristic curves of the digital/analog converter, solely through alteration of the duration of the polarity reversal phases, to adjust an optimum stop band of the light switches in their non through-connected direction.

Basically, however, it is also possible to identify the polarity reversal in the one direction and the return polarity reversal through polarity reversal commands variously formed in another fashion. Even if the polarity reversal commands are formed by particularly intense, brief light flashes of identical amplitude, polarity reversal commands for the polarity reversal in the one direction can be formed differently than the polarity reversal commands for the return polarity reversal, for example in that the polarity reversal command initiating the polarity reversal in the one direction is formed by a single such light flash vb and the polarity reversal command initiating the return polarity reversal is formed by two such light flashes following one another in close succession. In this case, in order to recognize the polarity reversal commands, not the amplitude of the light flashes, but their number is evaluated. For the purpose of evaluation, moreover, one can connect a threshold value circuit, for example at the input of the control arrangement (in the detector Det, cf. FIG. 5), which corresponds to the light flash vb, but not to the optical signal inf modulated with information signals. The recognized polarity reversal commands vb can be separated by the threshold value circuit from the other signals inf and can be supplied as a control command vb''' to the field generator Co for the purpose of field polarity reversal. In FIG. 4, the threshold value sw of such a threshold value circuit is indicated in order to show that the control command vb''' e.g. can be formed by that amplitude of the light flashes vb which exceed the threshold value sw. The amplitude of the control commands vb''' therefore amounts, for example, to (vb'-sw) or (vb"-sw).

The light flash can without difficulty be generated by a laser applied especially for this purpose, whereby the light flash vb is input coupled into the respective connection light guide LL in each instance of the switching network KF (cf. FIG. 5).

Normally, a longer pause tx=p of at least e.g. 400 ns, if not 500 ms, follows the polarity reversal command until the next time slot for signals os or inf. In the first portion of the pause p of for example 400 ns, the field is altered by the field generator Co with the time lapse tx=p, to be assigned thereto, and the field then most frequently remains for example for 500 ms, reversed in polarity. Within the first portion of the pause of 400 ns, however, (cf. FIG. 5) additional control signals is, for example measuring values for the respective non-path attenuation of the light switches S, can be transmitted. Because the receiving element, for example a diode in the detector Det, is initially most often overdriven by the light flash vb, prior to the transmission of the signals is, a brief recovery pause ep of for example 5 ns is then to be inserted. Such a recovery pause ep (cf. FIG. 4) is also to be inserted before the first time slot of the signals inf, in case the light flash vb, or an additional light flash vb, is also transmitted or fed in at the end of the polarity reversal pause p of 500 ms.

Although I have described my invention by reference to particular illustrative embodiments thereof, many changes and modifications of the invention may become apparent to those skilled in the art without departing from the spirit and scope of the invention. I therefore intend to include within the patent warranted hereon all such changes and modifications as may reasonably and properly be included within the scope of my contribution to the art.

I claim:

1. In a control arrangement for the control of a plurality of light switches each constructed as a directional coupler in integrated technology, of the type in which optical signals are guided through a pair of light waveguides on a substrate, in which two light waveguides are arranged on the substrate and each include an input, an output and a section parallel and at least closely adjacent a like section of the other waveguide along a switching path, in which the light is selectively switchable for direct through connection or cross-connection between the inputs and outputs, in which each light switch comprises at least one electrically conductive and controllable electrode for controlling through and cross-connections, the improvement therein comprising:
   a semiconductor substrate carrying a digital/analog converter whose analog output is stabilized with respect to DC supply voltage fluctuations,
   said digital/analog converter including an output connected to said at least one electrode,
   said digital/analog converter including an input for receiving digital signals;
   a byte generator connected to said input of said digital/analog converter and operable to provide digital words thereto, each of said digital words corresponding to the individual analog voltage requirement of an individually determined one of said light switches for controlling said determined light switch by said corresponding digital word generated by said light generator,
   said byte generator comprising first and second memories, said first memory storing words corresponding to through connection of said light waveguide, and said second memory storing words corresponding to cross-connection of said light waveguides,
   said byte generator also comprising a third memory storing information regarding whether said first or second memory is to supply a word to said digital/analog converter; and
   transfer switch means connected between said first and second memories and said digital/analog converter and connected to and operated by said third memory.

2. The improved arrangement of claim 1, wherein: said digital/analog converter comprises means for producing predetermined control potentials in response to corresponding digital words.

3. The improved arrangement of claim 1, and further comprising:
   a plurality of cyclically and successively operated switches connected between said output of said digital/analog converter and said light switches and carried on said substrate.

4. The improved arrangement of claim 3, and further comprising:
   means for supplying a DC potential on a common control input of said light switches.

5. The improved arrangement of claim 1, wherein: said control arrangement and said light switches are constructed on the same substrate.

6. The improved arrangement of claim 5, wherein: said substrate comprises GaAs.

7. The improved arrangement of claim 1, wherein:
   said light switches are constructed on a first substrate comprising LiNbO$_3$; and
   said control arrangement is constructed on a second substrate in thin film technology carried on said first substrate and comprising GaAs.

8. The improved arrangement of claim 7, and further comprising:
   an insulating layer of SiO$_2$ between said first and second substrates.

9. A method for controlling optoelectronic crosspoints of an exchange system, each of the crosspoints having light waveguides with at least closely parallel sections as intermediate lines extending through the crosspoints for carrying optical signals, each of the crosspoints comprising an optical switch manufactured in integrated technology with the light waveguides on a substrate, each of the light switches comprising electrically activatable electrodes for direct or cross switching the optical signals, comprising the steps of:
   cyclically reversing the polarity of electrical fields across some of the light switches; while
   simultaneously reversing the polarity of the fields of all switches on the same substrate in response to a polarity reversal command.

10. The method of claim 9, and further comprising the steps of:
    outcoupling a portion of the energy of the optical signals from the light waveguides, which signals include polarity reversal commands; and
    providing pauses to subdivide the optical signals into blocks.

11. The method of claim 10, and further comprising the steps of:
    modulating the optical signals in accordance with a predetermined code containing no long sequence of identical digits;
    transmitting a polarity reversal command as a sequence of identical digits immediately prior to the beginning of a pause;
    comparing the outcoupled signal to the output signals of a synchronously operated oscillator;
    counting the comparison result by counting the oscillator clock pulses during an interval in which the outcoupled signals contain identical digits only to determine whether a polarity reversal command is received or an ordinarily modulated signal modulated in accordance with said code is received; and
    changing the polarity of the field of a respective switch when the count reaches a predetermined count.

12. The method of claim 11, and further comprising the steps of:
    converting digital words into corresponding analog control voltages; and
    applying the analog control voltages to the electrodes of the respective light switches.

13. The method of claim 12, wherein:
    the step of conversion is performed with a digital/analog converter having a characteristic conversion curve; and further comprising the step of
    altering the conversion curve during the transmission of a data block of optical signals.

14. The method of claim 13, and further comprising the steps of:
measuring the intensity outcoupled from an undesired coupling branch; and
altering the characteristic curve in accordance with the measured intensity.

15. The method of claim 14, and further comprising the steps of:
storing first digital words converted during transmission; and
storing second digital words converted during pauses.

16. The method of claim 15, and further comprising the step of:
during a pause, transmitting optical signals over the same connection paths which are through-connected for transmission of information.

17. The method of claim 16, and further comprising the step of:
forming a reversal command as a brief light flash which has an intensity which is a multiple of that of information-bearing optical signals.

18. The method of claim 17, and further comprising the step of:
transmitting a return polarity reversal light flash at an amplitude different from that of the reversal command.

19. The method of claim 17, and further defined by the step of:
transmitting a light flash followed by a recovery pause.

20. The method of claim 19, wherein the step of transmitting a light flash is further defined as:
generating and transmitting the light flash with a laser device.

21. The method of claim 20, and further comprising the steps of:
detecting light signals, including said light flash, above a threshold valve as reversal commands.

* * * * *